Aug. 21, 1934. W. LELGEMANN 1,971,190
PROCESS OF TREATING HYDROCARBON PRODUCTS
Filed Sept. 1, 1932
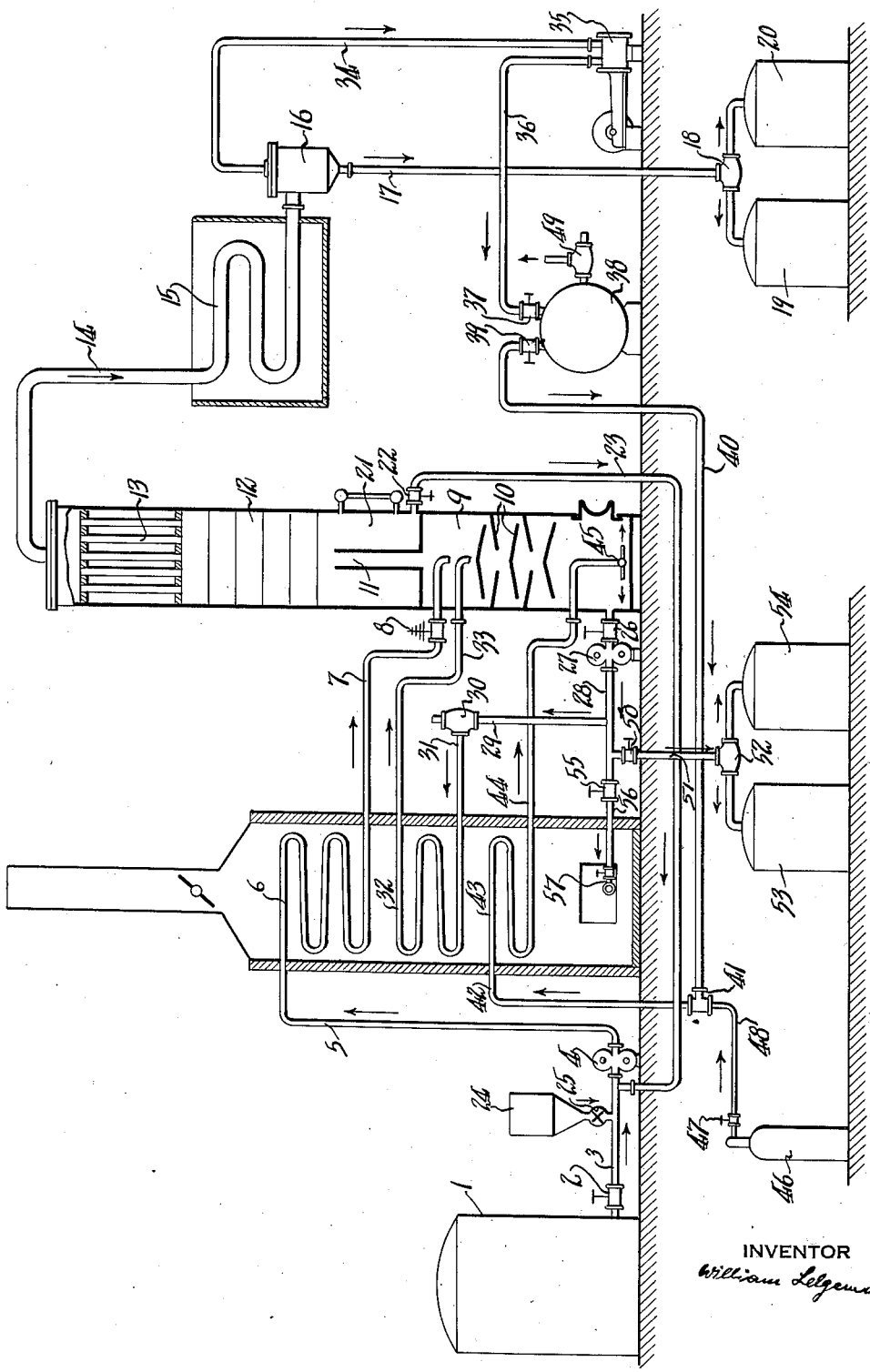
INVENTOR
William Lelgemann Patented Aug. 21, 1934

1,971,190

UNITED STATES PATENT OFFICE 1,971,190

PROCESS OF TREATING HYDROCARBON PRODUCTS

William Lelgemann, Newark, N. J., assignor to Hydrocarbon Processes Inc., a corporation of New Jersey Application September 1, 1932, Serial No. 631,382

3 Claims. (Cl. 196—52)

This invention relates to a process for treating an oil or mixture of oils or material containing the same and containing hydrocarbons, such as petroleum and other mineral oils, shale oil, etc., and distillates, fractions or residues obtained therefrom or admixed therewith, and other hydrocarbons and hydrocarbonaceous mixtures of relatively high boiling point, into a lower boiling, more easily vaporizable or more volatile material, in order to produce therefrom a gasolene substitute and a liquid capable of direct use in an internal combustion engine.

Depending upon the nature and composition of the raw material as to its physical constants and chemical composition which is being operated upon, I may produce either aliphatic hydrocarbons or a mixture in which aliphatic hydrocarbons predominate, or carbocyclic mixtures such as benzene, its homologues and isologues, or mixtures containing members of both open and closed chain hydrocarbons and derivatives thereof or obtained therefrom.

By means of my invention, mixtures of hydrocarbons of relatively lower boiling points are obtained from hydrocarbon mixtures boiling at relatively higher temperatures, and not only are suitable mixtures of oil vapor containing little or no tarry matter obtained, but the process may be operated intermittently or continuously as desired, in the absence of entering steam into the mixture, at normal or elevated atmospheric pressure, thus obviating the necessity for the employment of intricate and costly equipment, and admitting of a product being continuously produced of uniform range of physical constants and rate of combustion. My process to be described herein is especially applicable for the production of a gasoline or automobile or engine fuel of high octane number.

As suitable raw material I may employ, in addition to those mineral oils containing paraffins or paraffin bases primarily or alone, other bodies such as asphalts or fractions thereof or therefrom, distillates or residues, or oils containing aromatic substances such as crude creosote or creosotic bodies, crude naphthalenes and naphthalenic bodies, etc., for the production of benzene and other hydrocarbons, and the preparation of technical, pharmaceutical and medicinal products therefrom.

One method of carrying my process into effect is illustrated in the following drawing in which the oil to be cracked enters the system from tank 1, through valve 2, pipe 3, pump 4, pipe 5, heating coil 6, pipe 7, expansion valve 8, into reaction tower 9, and flows over filming contact plates 10, to the lower part of 9. The rising hydrocarbon vapors pass through pipe 11, into fractionating tower 12, reflux condenser 13, pipe 14, to condenser 15. The light fractions are condensed here and the liquid product flows through gas separator 16, pipe 17, valve 18, into tanks 19 and 20.

The reflux formed in condenser 13 and fractionating tower 12 flows back into reflux tank 21, and from there through valve 22, pipe 23, into pipe 3, and thence back through pipe 4, pipe 5, heating coil 6, pipe 7, valve 8, into reaction tower 9.

The catalytic material as oxides of chlorides enters the process from storage tank 24, through automatic feeder 25 into pipe 3, and in pump 4 is thoroughly mixed with the crude charging oil, and enters the process in the same way as the charging oil.

To maintain the constant reaction temperature in the lower part of reaction tower 9, the oil-catalyzer mixture is kept in constant circulation through valve 26, pump 27, pipes 28 and 29, reducing valve 30, pipe 31, heating coil 32, pipe 33, back into reaction tower 9 and over contact plates 10 to lower part of reaction tower 9.

To keep the hot oil 9 in agitation and preventing settling of catalytic oxides and other material, a part of the fixed gas formed in the cracking process is used as an agitating medium. This gas enters from gas separator 16 through pipe 34, compressor 35, pipe 36, valve 37, pressure tank 38, valve 39, pipe 40, injector 41 and is here mixed with the necessary nitrosyl chloride out of tank 46, through valve 47, pipe 48, and this gaseous mixture led through pipe 42, heating coil 43, pipe 44, distributor 45, into reaction tower 9.

The excess fixed gas leaves tank 38 through valve 49, and can be burned under the still. A part of the cycling oil is drawn off as residue periodically if desired, through valve 26, pump 27, pipe 28, valve 50, pipe 51, valve 52, to tanks 53 and 54. Part of the residuary cycling oil may be taken from tower 9 through valve 26, pump 27, pipe 28, valve 55, pipe 56, to oil burner 57.

In the description following, I make use of the term "hydrocarbon" or "hydrocarbons" in a general sense to designate mixtures such as mineral oils, shale oil, schist oil, and asphaltic bases, as well as residues, fractions and distillates therefrom and the like, being suitable raw materials applicable to my process to be herein set forth. One of the objects of this invention relates to an improved continuous heat treatment for "hydrocarbons" and the manufacture therefrom and thereby of a highly refractive, very mobile, volatile and inflammable spirit, which has a wide solvent power for a large number of chemicals and substances in addition to its value as a gasolene or substitute therefor.

One of the principal obstacles encountered in processes of this nature heretofore has been the deposition of carbon on the inner surfaces of the pipes in the apparatus in which the oil is heated, which not only renders it increasingly difficult to transmit external heat through the walls of the chamber or pipes to the interior, but the carbon has ultimately clogged up the passages to the point where the apparatus has been rendered ineffective or inoperative. This and similar difficulties are obviated in my process, or are apparent to such a minimum degree as not to seriously interfere with the operating efficiency of the process as a whole. In my process herein described, the relatively small amount of carbon formed seems to be in a colloidal or highly dispersed condition, which does not deposit upon the walls of the pipe or apparatus, at least not in an objectionable amount.

The commonly used modes of treating petroleum are reflux distillation followed by progressive distillation generally fractional, in which the different hydrocarbon compounds and mixtures (the so-called "cuts") are successively distilled off in the order of their relative volatility.

My improved method, which may be intermittent but preferably continuous, comprises catalytic and distillatory actions, thereby forming lower boiling and more valuable compounds from higher boiling and less expensive mixtures. Broadly, it comprises heating the raw material containing hydrocarbons by means of an appropriate source of heat, usually direct heating, applied in an advantageous manner, whereby the vapors are condensed by means of a reflux condenser.

The amount, and physical constants and chemical composition of the fraction or fractions obtained, depends upon the nature of the raw material; 2 the heating temperature; 3 the constants of the materials obtained in the distillation process; 4 the nature and amount of catalytically acting material employed; and 5 the time and temperature factor in the various stages or phases of the operation.

The degree of heat applied to the hydrocarbon raw material in the heating chamber will vary, depending upon the nature of the raw material operated upon, the speed with which the process is carried on, and the physical constants desired in the finished product. But always, the finished product has a substantially lower boiling point and more ready evaporation and speed of vaporization, than the raw material from which it is produced.

As catalytic material I prefer to use a halogenated oxide of nitrogen in conjunction with an element of the alkali earth metal group in combination. As a halogenated oxide of nitrogen, chlorine at the present time is the least expensive of the halogens and hence I prefer to use that in this connection. I may use a nitrogen oxychloride or nitrogen chloroxide such as nitrogen mono-oxide mono-chloride (NOCl), sometimes called nitrosyl chloride, which has been found satisfactory.

The nitrosyl chloride is not used alone by me, but always in conjunction with an alkaline earth metal compound such as an oxide, or a naturally occurring alkaline earth metal compound as bauxite. Of the oxides, I have used with satisfactory results magnesium oxide, strontium oxide and barium oxide, but I prefer to use calcium oxide on account of its abundance and cheapness and also because it is satisfactory in my process when employed in conjunction with nitrosyl chloride. I limit myself to the use of an alkaline metal compound in conjunction with a metal of Group III of the Mendeleeff System of Periodicity of the Elements in which aluminum, present in bauxite, is a member, or I may use the metal alone, as powdered aluminum in conjunction with NOCl, or aluminum metal in conjunction with other metals as aluminum bronze, preferably also finely divided, all in conjunction with, and for the transformation of, relatively higher boiling hydrocarbon combinations into those of relatively lower boiling point range. Especially, is my process applicable to the manufacture of high grade, low viscosity fuel oil.

As an illustration of one method of operation under my process, using, for example, nitrosyl chloride and calcium oxide, I may admix the calcium oxide finely powdered, a subdivision corresponding to 150-300 mesh being satisfactory, with the raw stock in the cold in any appropriate manner and in the proportion of ½-1½ pounds lime to a barrel of raw stock. I may also incorporate the lime or other alkaline earth metal oxide or alkaline earth metal compound with the raw stock at an elevated temperature. It is essential that the lime be finely divided, and dry when admixed with the raw stock, that the intermingling may be homogeneous. Any suitable stirring or admixing apparatus may be employed.

The nitrosyl chloride may be added to the charge in various ways. For instance, it may be incorporated with the raw stock in the cold, either before or after the lime is incorporated therewith, or if the lime is incorporated with the raw stock by heat, the nitrosyl chloride is preferably added after incorporation of lime, although it may be added before. Or, the nitrosyl chloride may be introduced together with the lime in the mixer, and if this is done, I prefer to maintain a heat of about 200° F. in the mixer as it insures more rapid and uniform incorporation of components. Or the nitrosyl may be introduced directly into the still containing the raw stock and lime admixed therewith, under atmospheric or elevated pressure, and this is the method preferred by me. From 2 to 16 ounces nitrosyl chloride per barrel of raw stock is used, the nitrosyl chloride, of course, being admitted continuously. I find that seldom more than 8 ounces nitrosyl chloride per barrel of raw stock is required to obtained the desirable results of high yield of low boiling distillate.

It is not necessary that the nitrosyl chloride be added to the raw stock continuously, but in my experience, it is preferable so to do, as it ensures a more uniform distillate in composition and in desirable physical constants.

If a batch kettle is used, it is advisable to have a stirrer therein, but if a tube still be employed, this is not necessary.

The temperature of the still will vary considerably according to the composition of the raw stock operated upon, and the physical constants desired in the finished product. Usually a temperature close to 800° F. is maintained, and if the nitrosyl chloride is introduced directly into the still, I prefer to heat the same to the approximate temperature of the still, so that its introduction will not induce any noticeable cooling of the still contents.

If the process is to be run discontinuous, then periodically when the increment of lime in the still becomes so that the contents is unduly thick, the heat may be withdrawn, the still cooled and the contents discarded and the process then again commenced. Or, as the still increases in non-volatizable content under the temperatures of distillation taken, by means of an opening of the bottom of the same, a portion may be periodically withdrawn and distillation then continued, and in this sense, the process is a continuous one. Direct heating has been found most satisfactory.

As a mean of several runs on a semi-commercial scale, whereas the use of lime alone gave a yield of 27% low-boiling hydrocarbons in a single cycle distillation, by the introduction of 8 ounces nitrosyl chloride per barrel raw stock, and proceeding otherwise identical with the first run, the low-boiling (same range as before) hydrocarbons was 58% in one cycle, based on the charged stock.

Instead of calcium in the form of an oxide, I may use calcium in other forms as in the naturally occurring bauxite, the same amount being employed as above stated for lime. Or, instead of using aluminum combined with calcium and other metals as in bauxite, I may use aluminum alone in conjunction with nitrosyl chloride, the aluminum being finely divided. However, 100 grams per barrel of raw stock has been found sufficient in conjunction with the amount of nitrosyl chloride above stated in order to obtain abnormally high yields of lower boiling hydrocarbons suitable as gasolene and for motor purposes from hydrocarbon mixtures of relatively higher boiling point.

Instead of powdered aluminum metal, I may use in approximately the same proportion, powdered aluminum alloys as aluminum bronze, or other aluminum-copper or aluminum-copper-zinc combinations. If aluminum metal or other aluminum metal alloy is employed, I prefer to incorporate it with the raw stock either before, with, or after incorporation of lime with the stock if lime is used, or if aluminum replaces entirely the lime, then I prefer to introduce it with the raw stock either in the cold or at moderately high temperatures.

In operating with various kinds of raw stocks, as an average, and proceeding as above stated, I have been able to obtain for a single cycle an increase of from 100% to 140% and in isolated instances upwards of 140% increase in yield when using (for example) a mixture of nitrosyl chloride and lime, over the use of lime alone in petroleum hydrocarbon distillation.

This process does not employ lime or a calcium-containing compound alone, but always is nitrosyl chloride present. By increase in yield is to be understood, as indicating increase in yield of those lower boiling hydocarbons of gasolene range of volatility and boiling point. It is advisable in the employment of calcium oxide, to see that it is as free as possible from calcium carbonate, and is in as finely divided condition as possible for results of maximum usefulness.

This method may be modified within wide limits according to the relative refractivity of the raw material, its competition, the degree of heat applied, and the temperature and physical characteristics of the cut or fraction distilled off that it is desired to obtain. The amount of nitrosyl chloride to be used will be governed to some extent by the relative refractivity and physical constants of raw material operated upon and the constants desired in the finished material, as is well known to those conversant with this particular art.

The above example is given merely for illustrative purposes, and may be varied within wide limits and still conserve the spirit and essence of my invention, which is the decomposition of hydrocarbons into hydrocarbon mixtures of relatively lower boiling point and suitable as a substitute for gasolene, obtained by heating the raw stock in the presence of nitrosyl chloride, and also in the presence of a compound of the alkali metal earth groups or group of elements, as in the oxide form, said compound to be in an extremely fine state of subdivision for best results as herein explained.

I claim:

1. A process for the conversion of high boiling petroleum fractions comprising heating the same in a chamber to a temperature of 500–1300° F. with a chlorinated oxygen compound of nitrogen in conjunction with a compound of calcium in amounts not exceeding five percent by weight of the original charge, distilling a lower boiling petroleum hydrocarbon fraction therefrom until a gasolene substitute is obtained.

2. A process for the continuous conversion of high boiling petroleum products, comprising admixing the same with both calcium oxide powder and nitrosyl chloride, then passing the same into a still where the contents are heated above 600° F. to produce a fraction therefrom suitable as a gasolene substitute, said fraction being then fractionated off and recovered as such, as herein set forth.

3. A process for the continuous conversion of relatively high boiling hydrocarbon mixtures to obtain relatively lower boiling hydrocarbons suitable as gasoline, automobile or engine fuel of high octane number, comprising mixing the raw stock with powdered calcium oxide in proportion of one pound to one barrel of stock, introducing the mixture into a still heated from underneath, bringing the temperature of said still to a temperature of about 800° F., then introducing continuously nitrosyl chloride into said still in the proportion of about one pound said nitrosyl chloride per 100 gallons raw stock, continuing the addition of raw stock containing lime and nitrosyl chloride addition for an indeterminate period, meanwhile leading off the fractions of relatively lower boiling points and condensing the same, substantially as herein described.

WILLIAM LELGEMANN.